United States Patent

Soilleux et al.

[11] Patent Number: 5,810,995
[45] Date of Patent: Sep. 22, 1998

[54] DISPOSAL OF ORGANIC MATERIALS ENCASED IN METAL

[75] Inventors: Richard James Soilleux, Salisbury; David Frame Steele; Nigel Desmond Evan Warren, both of Caithness, all of United Kingdom

[73] Assignee: AEA Technology plc, Didcot, United Kingdom

[21] Appl. No.: 732,391

[22] PCT Filed: Jun. 5, 1995

[86] PCT No.: PCT/GB95/01287

§ 371 Date: Oct. 22, 1996

§ 102(e) Date: Oct. 22, 1996

[87] PCT Pub. No.: WO96/03182

PCT Pub. Date: Feb. 8, 1996

[30] Foreign Application Priority Data

Jul. 22, 1994 [GB] United Kingdom .................... 9414812

[51] Int. Cl.⁶ ............................................ A62D 3/00
[52] U.S. Cl. ................... 205/688; 205/702; 205/717; 205/771; 204/267; 204/271
[58] Field of Search .................... 205/702, 717, 205/688, 771; 204/267, 271

[56] References Cited

U.S. PATENT DOCUMENTS

| 3,202,733 | 8/1965 | Strauss | 205/702 |
| 3,793,172 | 2/1974 | Cadieux | 204/146 |
| 3,909,388 | 9/1975 | Faust | 204/224 M |
| 4,098,659 | 7/1978 | Inverso | 204/129.65 |
| 4,160,314 | 7/1979 | Fridy | 29/558 |
| 4,287,033 | 9/1981 | Weibel | 204/146 |
| 4,874,485 | 10/1989 | Steele | 204/130 |
| 5,120,409 | 6/1992 | Hanulik | 204/105 R |

FOREIGN PATENT DOCUMENTS

| 0105551 | 4/1984 | European Pat. Off. . |
| 53-7504 | 1/1978 | Japan ................... 205/702 |

*Primary Examiner*—Arun S. Phasge
*Attorney, Agent, or Firm*—D. Peter Hochberg; William H. Holt; William R. Hinds

[57] ABSTRACT

The casing metal of, for example, a munition containing organic materials is removed or at least perforated by anodic dissolution in a chamber (16) fabricated to contain the explosion should the munition detonate. The contents are then exposed to reaction with anolyte from a plant (17), the anolyte comprising nitric acid and electrochemically regenerable silver II ions.

7 Claims, 3 Drawing Sheets

DISPOSAL OF ORGANIC MATERIALS ENCASED IN METAL

This Application is a 371 of PCT/GB95/01287 filed Jun. 5, 1997.

The invention relates to a method and apparatus for the disposal of organic materials encased in metal and more specifically to the disposal of metal encased munitions such as bullets, shells, land mines, bombs, etc.

Organic materials comprising the contents of such munitions can be decomposed by electrochemical oxidation in nitric acid containing ions of silver It as an electrochemically regenerable oxidising species. Methods and apparatus suitable for such electrochemical decomposition are described in our patent specification EP 0297738 and the specification of our patent application No GB 94 11212.5.

Before such treatment of the contents of a munition can be carried out, the metal casing, usually comprising iron, steel or aluminium, has to be removed or penetrated to allow extraction of the contents. Conventional techniques for this purpose comprise drilling through the casing and draining out the contents, cutting up the casing using, for example an abrasive water jet, and cryogenic fracturing of the casing.

All of these methods involve extensive handling of the munition and treatments during all of which there is a risk of explosion, particularly where the munition for destruction is "non-stockpile", that is to say recovered from the ground where the munition has been deliberately buried, or has buried itself after firing but failing to detonate (e.g. on ranges).

The invention provides, in one of its aspects, a method for the disposal of organic materials selected from the group consisting of explosives, dangerous chemical agents and chemical warfare agents, encased in metal, which method comprises contacting the metal with an electrolyte and passing electrical current through the electrolyte via the metal and at least one other electrode to cause anodic dissolution of the metal, in which method anodic dissolution is continued until the organic materials encased therein are released, and nitric acid is circulated so as to carry the released organic materials directly from the remains (if any) of the metal (11) to an electrochemical cell containing nitric acid and ions of silver II as an electrochemically regenerable primary oxidising species and in which electrochemical cell the released organic materials are decomposed.

Preferably the said electrolyte comprises nitric acid and the decomposition of the released organic materials is carried out by circulating the nitric acid electrolyte through the said electrochemical cell after anodic dissolution of the said metal has released the organic materials encased thereon.

Silver is dissolved in the nitric acid electrolyte either before or after the anodic dissolution so that the required level of silver ions is maintained in the electrochemical cell during the said circulation of nitric acid electrolyte therethrough.

In this way the metal casing is penetrated with the minimum of mechanical handling and it is possible to carry out the subsequent decomposition of the organic contents, rendering them safe, without further movement or mechanical handling of the casing and its contents.

The invention also provides apparatus for use in the disposal of organic materials encased in metal, which apparatus comprises an enclosure for containing an electrolyte, means for supporting a metal casing containing organic materials, within the enclosure in contact with electrolyte, at least one electrode within the enclosure, connection means for creating an electric potential between the said one electrode as cathode and the said metal casing as anode, to cause anodic dissolution of the metal and valve means operatively connected to circulation means for isolating and, connecting the enclosure to a separate electrochemical cell for circulation of the electrolyte therethrough said enclosure holding the metal until organic materials encased therein are released by anodic dissolution, being actuated to circulate the nitric acid from an electrochemical cell containing nitric acid and ions of silver II as an electrochemically regenerable primary oxidizing species, to carry the released organic materials directly from any remains of the metal to the electrochemical cell, the released organic materials being decomposed in the electrochemical cell.

Preferably the enclosure comprises a sealable reinforced containment vessel capable of containing an explosion of a munition or other explosive device comprising a metal casing containing organic material supported within the enclosure. Such an apparatus can readily be mounted upon a vehicle so as to be transportable. Conveniently the apparatus is mounted upon the vehicle together with power supplies for providing electric current for the anodic dissolution of a metal casing supported within the enclosure.

Such an apparatus can then be transported to the site of, for example, an unexploded bomb and the bomb and contents made safe at the site with the minimum of handling and movement.

For such applications there is advantage in providing that there is mounted upon the same, or a separate support, vehicle an electrochemical cell comprising an anode, a cathode and an electrolyte of nitric acid containing ions of silver II as an electrochemically regenerable primary oxidising species, the electrochemical cell being adapted to be coupled via isolating/connecting valve means with the aforesaid enclosure so that electrolyte can be circulated between the enclosure and the electrochemical cell.

BRIEF DESCRIPTION OF THE DRAWINGS

Specific constructions of apparatus, and methods, embodying the invention will now be described by way of example and with reference to the drawings filed herewith, in which.

In the apparatus and methods of these examples munition 11 contains organic materials, which will normally include an explosive but may also comprise other dangerous chemicals such as chemical agents and/or precursors of chemical warfare agents.

The metal casing of the munition is dissolved electrochemically by anodic dissolution so that as a DC current flows, the metal casing is sacrificially dissolved as part of the current carrying mechanism.

Figure 1:
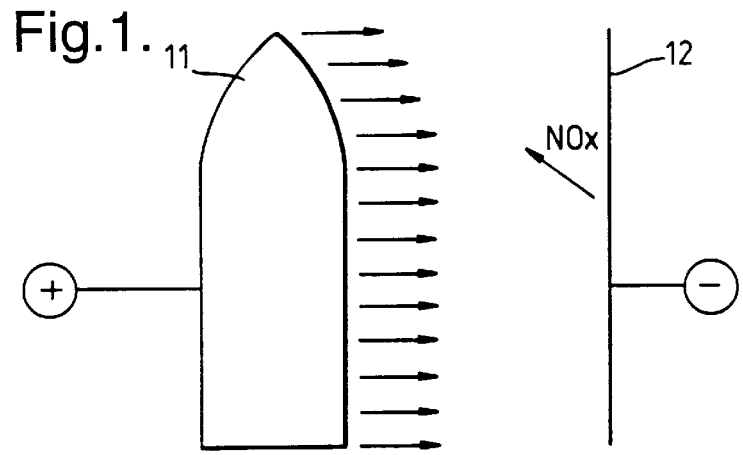
FIGS. 1 to 6 are diagrammatic representations of various different anodic dissolution configurations.
Figure 2:
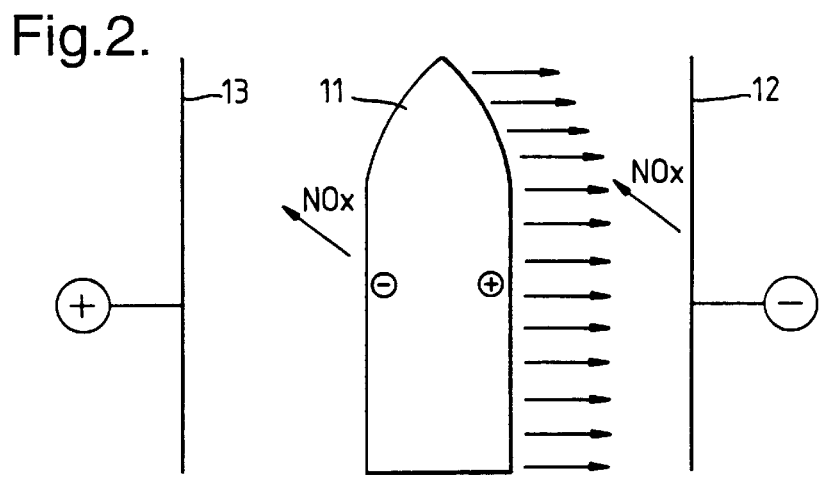

The electrochemical dissolution cell comprises an electrolyte of nitric acid and a cathode 12. FIG. 1 shows in principle an approach in which electrical connection is made directly to the munition 11 which comprises the anode. The arrows indicate the anodic dissolution of metal from the casing of the munition 11. FIG. 2 shows in principle an approach in which the munition 11 is positioned within the electrolyte (not shown) between the cathode 12 and a separate platinum anode 13. A positive and negative charge is then induced on the munition 11 as shown and, as current flows, metal from the casing in the regions of induced positive charge is anodically dissolved, as indicated by the arrows.

Figure 3:
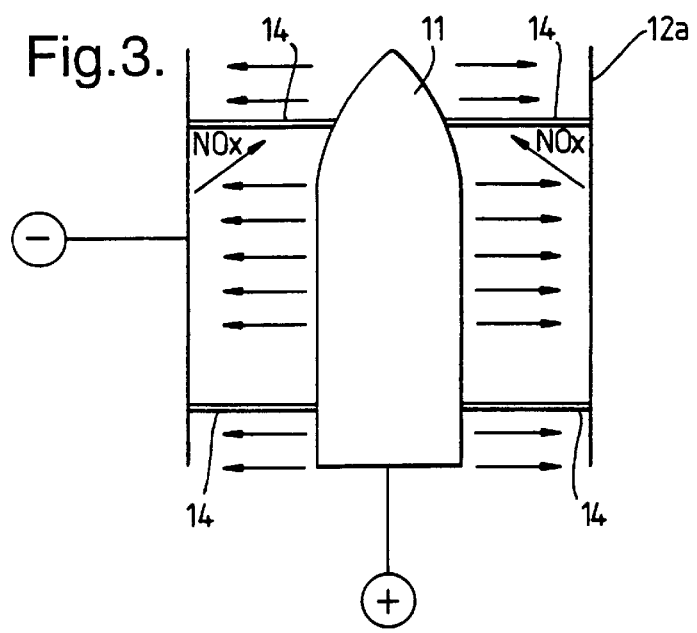
Figure 4:
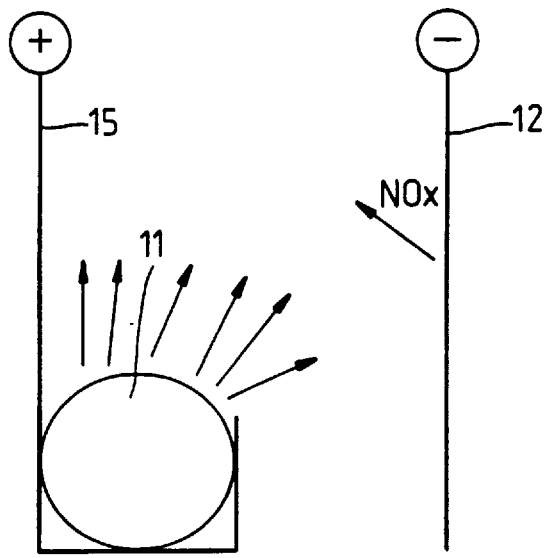

FIGS. 3 and 4 illustrate arrangements, based upon the principle of FIG. 1, intended to achieve complete dissolution of the metal casing of munition 11. In FIG. 3, the cathode 12a is cylindrical and the munition 11 is supported axially within the cathode 12a on separators 14 fabricated from an electrically insulating material which is also resistant to oxidation in the presence of silver II ions. A suitable material for the separators 14 is PTFE coated stainless steel.

In the arrangement shown in FIG. 4, the munition 11 is held in a tray 15 which has an extension which acts as anode current feeder. As the casing of the munition 11 is dissolved, the munition 11 remains always in contact with the current feeder, so that dissolution can continue, if desired, until none of the metal casing remains.

Figure 5:
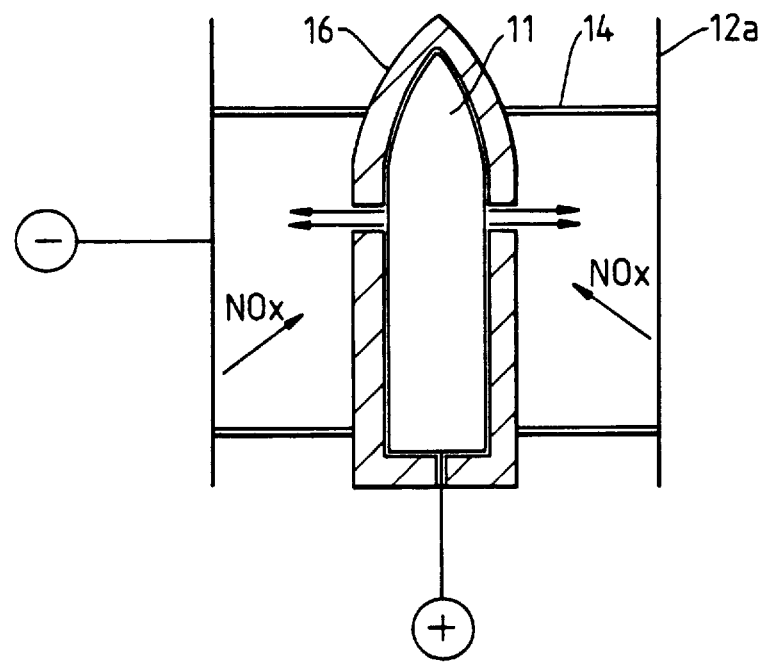

FIG. 5 shows a modification of the FIG. 3 arrangement to provide for confinement of the anodic dissolution to a selected region of the casing of the munition 11. This is achieved by cladding the munition 11 with a close fitting electrical shield 16 of material which is both resistant to oxidation when silver II ions are present and is electrically insulating or does not act as an electrode. PTFE is a suitable material for the shield 16. Alternatively the shield can comprise one of the so called "valve metals", i.e. zirconium, niobium, and tantalum, all of which conduct electricity but will not sustain electrochemical reactions on their surface. Such "valve metals" are passivated in nitric acid by the formation of an electrochemically inert acid layer. Titanium can also be used as a shield provided the anode potential does not rise above 5 volts versus SHE (standard hydrogen electrode). At higher anode potentials in nitric acid, the protective oxide coating on the surface of titanium breaks down and Ti is converted to voluminous hydrated $TiO_2$, which is not protective and falls off, exposing fresh metal to attack.

Figure 6:
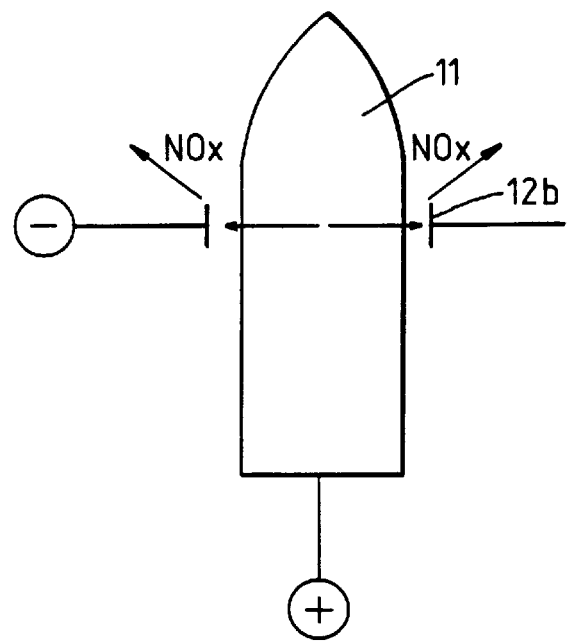

FIG. 6 shows an alternative modification of the FIG. 3 arrangement to provide for confinement of the anodic dissolution to a selected region of the casing of the munition 11. The cathode 12b is in the form of a short cylinder. Significant anodic dissolution of the casing of the munition 11 occurs only in the region close to the cathode 12b.

In all of the examples illustrated in FIGS. 1 to 6, it will be appreciated that the electrodes and the munition 11 are immersed in electrolyte in a suitable container which must be such as is unaffected by the electrolyte and reaction products.

Aluminium is passivated in nitric acid by the formation of an electrochemically inert oxide layer. Anodic dissolution prevents the formation of this passivating layer and allows the metal dissolution to take place.

If the casing of the munition 11 is made from aluminium then the anodic dissolution reaction is:

$$Al = Al^{3+} + 3e^-$$

The rate of dissolution of the aluminium, assuming 100% utilisation of the current, would be 0.34 g Al/Amp/hr.
If the casing is made from iron or steel then the anodic dissolution reaction is:

$$Fe = Fe^{3+} + 3e^-$$

The rate of dissolution of the iron, assuming 100% utilisation of the current, would be 0.70 g Fe/Amp/hr. Unlike aluminium, iron is not passivated in nitric acid, except at very high acid concentrations. Consequently the actual dissolution rate would be higher than that expected for solely anodic dissolution as the iron (unless it has been previously treated with nitric acid at very high concentration to form a protective surface layer of $Fe_3O_4$) will react with the nitric acid.

A suitable material for cathodes 12, 12a, 12b is stainless steel. The electrochemical reaction at the cathode in this case is reduction of nitric acid to nitrous acid:

$$HNO_3 + 2H^+ + 2e^- = HNO_2 + H_2O$$

In practice, the nitrous acid will decompose in the hot acid environment to give rise to nitrogen oxide gases, as indicated diagrammatically in the FIGS. 1 to 6.

Care has to be exercised in selecting the material used to fabricate DC current feeders to the munition 11 (see FIGS. 1, 3, 4, 5 and 6). The selected material must be resistant to the electrolyte and not act as an electrode introducing unwanted electrochemical reactions whilst feeding current to the casing of the munition 11. In particular, where it is desired to use an electrolyte containing silver ions (see description of FIG. 7 below), it may be inconvenient for the anode reaction converting silver I ions to silver II ions to occur along the length of the anode current feeder. In these circumstances, "valve metals" are suitable materials for the current feeder, but platinum is not suitable.

For this reason the arrangement shown in FIG. 2, employing a platinum anode, is not suitable if the electrolyte contains silver ions. However, if a different anode material, which does not sustain the anode reaction converting silver I ions to silver II, is employed, then the FIG. 2 arrangement can be adopted.

Figure 7:
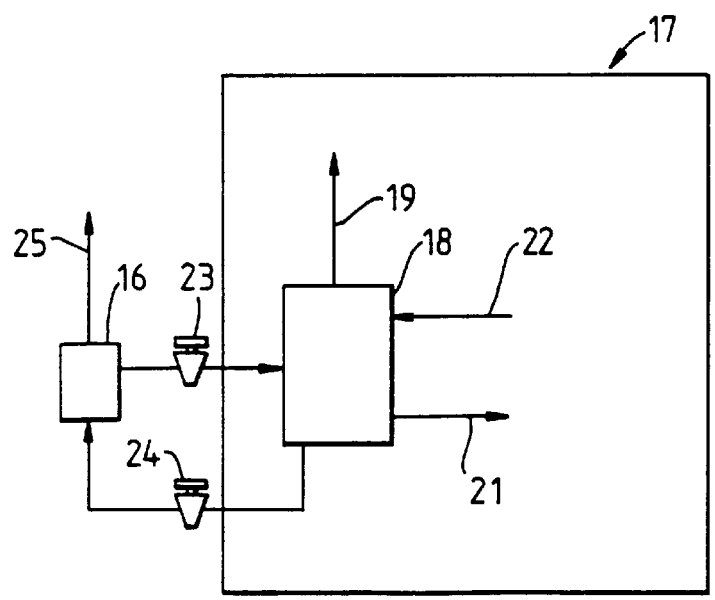
FIG. 7 is a diagrammatic representation of an anodic dissolution cell coupled to an anolyte vessel of an electrochemical cell containing nitric acid and ions of silver as an electrochemically regenerable primary oxidising species.

FIG. 7 illustrates a particularly advantageous configuration of apparatus in which a chamber 16 for anodic dissolution is combined with a plant 17 for the decomposition of organic materials by nitric acid containing silver II ions as an electrochemically regenerable oxidising species.

The plant 17 is of the form described in patent specification EP 0297738 or patent specification GB 94 11212.5. For simplicity only anolyte vessel 18 is shown, with arrows to indicate provision at 19 for anolyte offgas treatment, at 21 for removal of anolyte to effect regeneration, and at 22 for return feed of regenerated, silver II rich, anolyte.

The chamber 16 is coupled, via valves 23, 24 to anolyte vessel 18 to provide for circulation of the anolyte of plant 17 through the chamber 16. Provision is made at 25 for removal and recovery of nitrogen oxide offgas from chamber 16.

The chamber 16 contains electrodes and munition mounting provision. These can conveniently be in the form of any one of the arrangements described with reference to FIGS. 1, 3, 4, 5 or 6.

The chamber 16 is constructed to resist the resultant explosion if the munition should detonate.

Initially electrolyte, which will contain silver ions but preferably with a minimum of silver II ions present, is introduced into the chamber 16. The valves 23, 24 are closed to isolate the chamber 16 from the plant 17 and the munition positioned in the chamber 16. Electric current is passed to dissolve anodically all or part of the metal casing of the munition.

Once the contents of the munition are exposed, the valves 23, 24 are opened, the plant 17 set into operation and anolyte from vessel 18 circulated via pumps (not shown) through the chamber 16. In operation of the plant 17 silver II ions are generated electrochemically and, in association with secondary oxidising species, decomposes organic constituents of the contents of the munition.

Whilst it is convenient to use the same anolyte for the operation of plant 17 and for the anodic dissolution of the casing of the munition, it will be appreciated that the chamber 16 can, if desired, initially be isolated from plant 17 and filled with a different electrolyte, e.g. nitric acid without added silver. In that case, it would be possible to carry out the anodic dissolution by the method of FIG. 2. It would be necessary, either to remove the electrolyte from chamber 16 before commencing circulation of anolyte from plant 17 or, if the electrolyte is nitric acid, introduce additional silver ions to make up the required concentration for the second stage of the process in which the organic contents of the munition are decomposed.

The chamber 16 and the plant 17 are conveniently mounted either together on a single vehicle or on separate vehicles, in each case the vehicle or vehicles would carry all ancillary equipment including power supplies and reagents. The equipment is then readily brought to the site of the munition which is to be disposed of. It is practicable either to carry out the complete operation at the site or alternatively, to take only the chamber 16 to the site and carry out anodic dissolution at the site to a stage at which the munition is rendered safe. The chamber 16 and contents could then be moved to a convenient location to couple to plant 17 and complete the decomposition process.

The invention is not restricted to the details of the foregoing examples.

We claim:

1. A method for the disposal of organic materials selected from the group consisting of explosives, dangerous chemical agents and chemical warfare agents encased in metal, which method comprises contacting the metal with an electrolyte and passing electrical current through the electrolyte via the metal and at least one other electrode to cause anodic dissolution of the metal, in which method anodic dissolution is continued until the organic materials encased therein are released, and nitric acid is circulated so as to carry the released organic materials directly from the remains (if any) of the metal to an electrochemical cell containing nitric acid and ions of silver II as an electrochemically regenerable primary oxidizing species and in which electrochemical cell the released organic materials are decomposed.

2. A method as claimed in claim 1, in which silver is dissolved in the nitric acid electrolyte either before or after the anodic dissolution so that the required level of silver ions is maintained in the electrochemical cell during the said circulation of nitric acid electrolyte therethrough.

3. Apparatus for the disposal of organic materials encased in metal, which apparatus comprises an enclosure for containing an electrolyte, means for supporting a metal casing containing organic materials within the enclosure in contact with electrolyte, at least one electrode within the enclosure, connection means for creating an electric potential between the said one electrode as cathode and the said metal casing as anode to cause anodic dissolution of the metal, and valve means operatively connected to circulation means for isolating and connecting the enclosure to a separate electrochemical cell for circulation of the electrolyte therethrough, said enclosure holding the metal until organic materials encased therein are released by anodic dissolution, and said valve means being actuated to circulate the nitric acid from an electrochemical cell containing nitric acid and ions of silver II as an electrochemically regenerable primary oxidizing species, to carry the released organic materials directly from any remains of the metal to the electrochemical cell, the released organic materials being decomposed in the electrochemical cell.

4. Apparatus as claimed in claim 3, in which the enclosure comprises a sealable reinforced containment vessel containing an explosion of a munition or other explosive device comprising a metal casing containing organic material and supported within the enclosure.

5. Apparatus as claimed in claim 3, mounted upon a vehicle so as to be transportable.

6. Apparatus as claimed in claim 5, mounted upon the vehicle together with power supplies for providing electric current for the anodic dissolution of the metal casing supported within the enclosure.

7. Apparatus as claimed in claim 5, there being mounted upon the same, or a separate, vehicle an electrochemical cell comprising an anode, a cathode and an electrolyte of nitric acid containing ions of silver II as an electrochemically regenerable primary oxidising species, the electrochemical cell being coupled via said valve means with the aforesaid enclosure whereby electrolyte can be circulated between the enclosure and the electrochemical cell.

\* \* \* \* \*